(No Model.) 3 Sheets—Sheet 1.

J. K. CALDWELL.
BRICK KILN.

No. 535,670. Patented Mar. 12, 1895.

Witnesses.
E. F. Elmore
Frank D. Merchant

Inventor.
John K. Caldwell
By his Attorney.
Jas. F. Williamson (No Model.) 3 Sheets—Sheet 2.

J. K. CALDWELL.
BRICK KILN.

No. 535,670. Patented Mar. 12, 1895.

Witnesses.
E. F. Elmore
R. L. Merchant

Inventor.
John K. Caldwell
By his Attorney.
Jas. F. Williamson

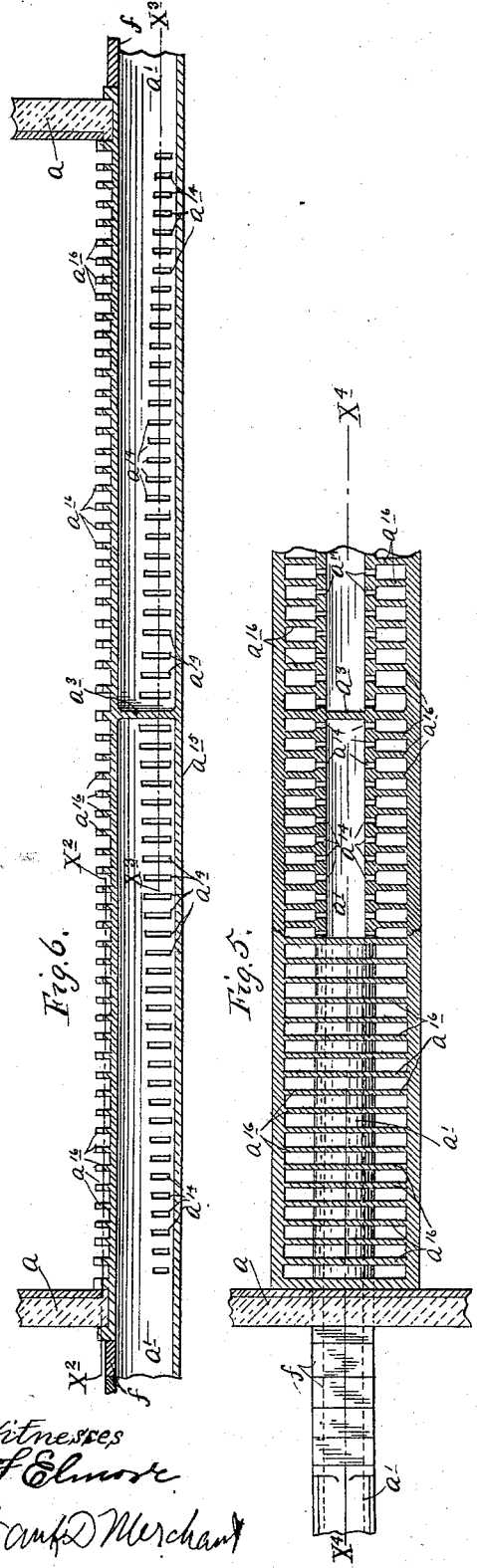

UNITED STATES PATENT OFFICE.

JOHN K. CALDWELL, OF MINNEAPOLIS, MINNESOTA.

BRICK-KILN.

SPECIFICATION forming part of Letters Patent No. 535,670, dated March 12, 1895.

Application filed February 9, 1894. Serial No. 499,580. (No model.)

*To all whom it may concern:*

Be it known that I, JOHN K. CALDWELL, a citizen of the United States, residing at Minneapolis, in the county of Hennepin and State of Minnesota, have invented certain new and useful Improvements in Brick-Kilns; and I do hereby declare the following to be a full, clear, and exact description of the invention, such as will enable others skilled in the art to which it appertains to make and use the same.

My invention has for its object to provide an improved brick burning plant.

The several novel features of my invention will be hereinafter fully described and defined in the claims.

Figure 2:
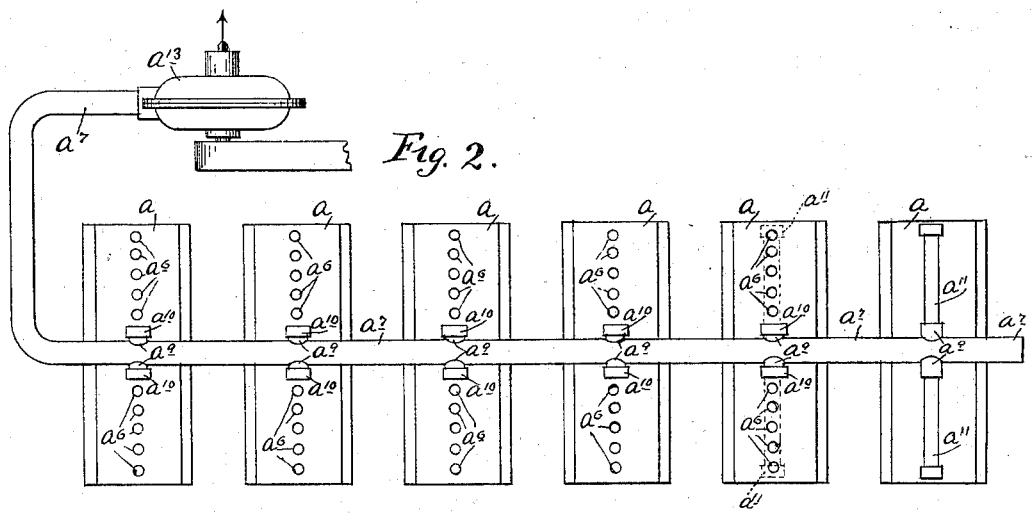
Figure 1:
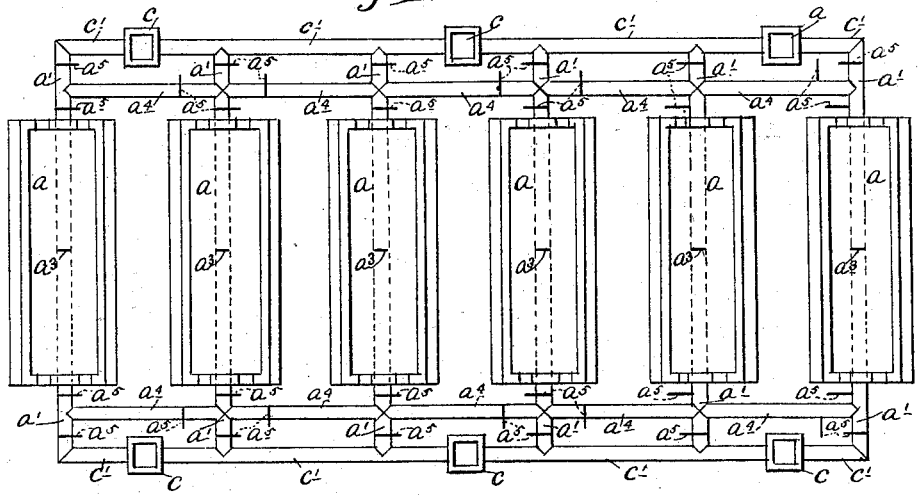
Figure 3:
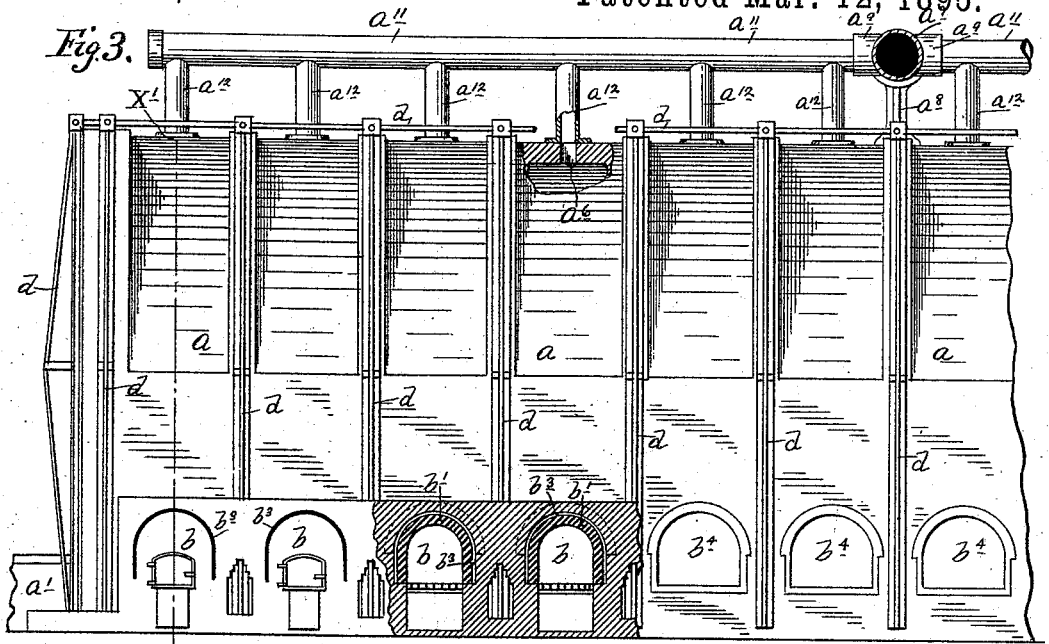
Figure 4:
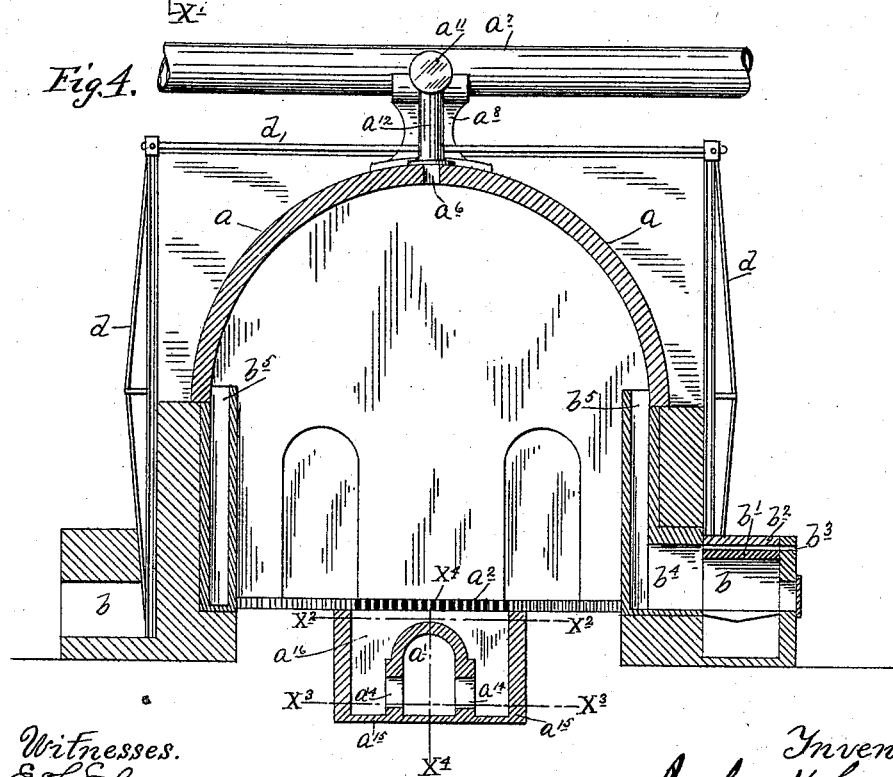

In the accompanying drawings, like letters referring to like parts—Figure 1 is a ground plan in diagram lines, of a plant with my improved system of flues, for the purposes above stated. Fig. 2 is a top plan of the series of kilns in diagram lines, showing the outdraft appliances, which co-operate with the flues shown in Fig. 1. Fig. 3 is a view, chiefly in side elevation, but partly in section, showing one of the series of kilns, with some parts broken away. Fig. 4 is a vertical cross section, on the line $x'\ x'$ of Fig. 3, looking from the left toward the right. Fig. 5 is a horizontal section through the flue-pit and central flue, partly on the line $x^2\ x^2$, and partly on the line $x^3\ x^3$, of Figs. 4 and 6 with some parts broken away; and Fig. 6 is a longitudinal vertical section, through the central flue and flue-pit, on the line $x^4\ x^4$ of Figs. 4 and 5.

$a$ represents the bodies, and $b$ the furnaces of a series of down-draft kilns, shown, in Figs. 1 and 2, as arranged in transverse line with each other.

$c$ represents the stacks, for the entire series of kilns.

$a'$ represents the so-called central flue, extending horizontally under the grating $a^2$ of each kiln. The central flues $a'$ are extended, at each end, beyond the kiln proper and joined to outside stack tapping flues $c'$. The central flues are divided, at their middle points, by a closed partition $a^3$. The projecting ends of the central flues $a'$ are connected inside the stack-flues $c'$, by transverse flues $a^4$. In this system of ground flues, are suitably located a series of dampers $a^5$, which are operative to cut off any one or more of the kilns from the stack-flues $c'$, and to throw into communication any two or more of the kilns through the transverse flues $a^4$. Each kiln has the customary series of crown holes or center openings $a^6$.

To the tops of the kilns are applied outdraft appliances, consisting as shown, of a main top flue $a^7$, extending transversely over the entire series of kilns, supported therefrom, in any suitable way, as by brackets $a^8$, and provided with lateral joint or elbow sections $a^9$, which are normally closed by removable caps $a^{10}$; movable branches, consisting of body and leg-sections $a^{11}\ a^{12}$, the leg sections of which are flanged and connectible with the crown holes $a^6$ of any kiln, and the body sections of which are connectible with the joint sections $a^9$ of the main top-flue $a^7$, by removing the caps $a^{10}$; and a forced draft device $a^{13}$, shown as in the form of a fan applied to an extension of the flue $a^7$. These top flues are preferably in the form of pipes, as shown; and with the transverse arrangement of the main member $a^7$, a single set or pair of the movable branch-flues $a^{11}\ a^{12}$, will serve to connect all the crown holes $a^6$ of any kiln, with the said main flue $a^7$, at will. When the movable branch-members $a^{11}\ a^{12}$, are in position for use, the joints of the leg-sections $a^{12}$ with the crown holes $a^6$, may, if necessary, be rendered tight by plastering the same with mud or mortar. A suction fan is the preferred form of forced draft device; but any other suitable form might be substituted, such for example, as a steam-jet ejector.

Having regard now to the action of the parts so far described, suppose that the right-hand member of the series of kilns be filled with green brick, which it is desired to dry off or "water-smoke" and that the next adjacent kiln be occupied with burned brick, which it is desired to cool off. The movable flues $a^{11}\ a^{12}$ would be applied to the top of the green kiln, as shown in Figs. 2 and 3. The dampers $a^5$ would then be set to shut off both of the said assumed kilns from the stack-flues $c'$, and to throw the same into communication, through the transverse flues $a^4$ connecting their central flues $a$. On then starting the fan $a^{13}$, the hot air and gases from the cooling kiln will be drawn out, from below, with a down-draft, and be applied, from below, to the green kiln, with an up-draft, thereby simultaneously cooling off the one and drying off or "water-smoking" the other, in the manner most beneficial for the best results in each. The down draft on the cooling kiln is desirable, for the reason that, in burning the brick in these down draft kilns, the top brick get the first and greatest effect of the heat from the furnaces, and the bottom brick the least. The top brick are therefore burned most, and the bottom brick least. Hence, in cooling, it is desirable to rectify this and equalize the burning, as far as possible, by drawing the hot air and gases from the top downward, so as to remove the same first from the top brick and hold the same longest on the bottom brick where most needed. Likewise, it is desirable to dry off or "water-smoke" the green kiln, with an up draft from the bottom, in order that the lower brick may dry out first and be thus able to better sustain the load from the upper brick. Where the drying off or "water-smoking" is done with a down draft, the top brick dry first, and the moisture therefrom is largely taken up by the lower brick thereby unfitting them to sustain the superincumbent load and sometimes causing them to run. My improved method therefore, not only utilizes the waste heat from the cooling kiln, but manipulates the same in the manner most beneficial for the brick in both kilns.

Turning now to other features, the central flue $a'$, under each kiln, differs from others hitherto made, so far as I am aware, in the fact that it has a closed top, preferably in the form of a continuous arch, and that the inlet openings $a^{14}$ are in the side walls of the flue, and as near as possible to the bottom of the flue-pit $a^{15}$; and further, in the important fact, that these inlet openings $a^{14}$ are graduated in size, as clearly shown in Fig. 6, increasing in regular gradation from the minimum, at the point nearest to the stack, to a maximum, at the point most remote from the stack. Vertical partitions $a^{16}$ are also placed in the flue-pit, forming close joints with the exterior of the flue and the interior of the flue-pit walls, and properly spaced apart to form separate passages from the kiln-grate $a^2$ to the said pairs of opposite inlet-openings $a^{14}$ of like size. The object of the graduated series of openings $a^{14}$ is to equalize the draft; as it is, of course, well known that the draft will be strongest at the point nearest to the stack or stack-flue. By properly graduating the openings $a^{14}$, the draft may be made substantially uniform and equal at all points in the kiln. The object of the closed top to the flue $a'$, preferably in the form of an arch, and the location of the openings $a^{14}$ in the side walls, is to afford better clearance for the movement of the hot air and gases through the central flue. Where the central flue is open at the top, or has its inlets from the top, the down columns of hot air and gases interfere more or less with the horizontal column tending to move lengthwise through the flue. With my construction, as shown, the whole of the flue-arch is available for the unobstructed and free passage of the horizontal column of hot-air and gases toward the stack.

The other feature of my invention is directed to a detail of construction for securing the more perfect combustion of the burning gases from the furnaces $b$. This I accomplish by constructing the furnaces with double arches $b'$ $b^2$, having their crowns spaced apart a short distance, say, one-half or three-fourths of an inch, to form a chamber $b^3$, for supplying fresh and heated air to the burning gases from the furnace. This chamber or air-passage $b^3$, between the crown of the furnace-arches, is open, at the exterior of the furnace, for the admission of the fresh air and discharges into the burning gases, at the kiln-throat $b^4$. In its passage, through this chamber $b^3$, the air will become highly heated from the crown of the inner arch $b'$, and when discharged into the burning gases at $b^4$, will greatly intensify the combustion, thereby producing a large economy in fuel. The burning gases from the furnace $b$ are delivered to the top of the kiln through the up-take or inside furnace flues $b^5$. Thence their passage is downward through the burning brick into the central flue $a'$ and out to the stack. The air-passage or chamber $b^3$ may be conveniently made, when forming the furnace-arches, by overlaying the inner crown with wooden battens, and then building the outer crown over that and, after the arches are completed, so as to be self sustaining, pulling out the battens or permitting the same to burn out which they will quickly do under the heat from the furnaces.

The kilns are braced by suitable vertical and cross metallic trusses $d$, as shown in Figs. 3 and 4, in the usual way; and all the details otherwise than hereinbefore noted, may be of the well-known standard construction employed in down draft kilns.

The plant herein described was especially designed for burning pressed brick, suitable for building fronts, or vitrified brick, suitable for street pavement. It is well-known that these classes of brick must be uniformly burned throughout. This plant is well fitted to accomplish that result and to turn out either class of the highest grade and with the greatest economy.

It will be understood, that many of the details of the several features of my invention might be changed without departing from the spirit thereof. For example, the form of apparatus which I have shown for applying my improved method of cooling off a burned kiln and drying off or "water-smoking" a green kiln, although the best construction which I know for the purpose, might be substituted by others, which would, more or less adequately, accomplish the same result. Again, the graduated openings $a^{14}$ or inlets to the central flue $a'$, would be a material improvement wherever placed, whether at the sides or at the top of the flue; and of course, it will be understood, that I do not limit myself to any particular size for these inlet openings, or any particular percentage of gradation from the smallest to the largest.

Having regard to the series of kilns, shown in Figs. 1 and 2, it is obvious from inspection that the flue system there shown, will permit any two or more cooling kilns to be cut off from the stack and thrown into communication with a single drying off or green kiln; and likewise, by duplicating the sets of movable flues $a^{11}$ $a^{12}$, two or more kilns might be dried off or "water-smoked" at the same time. It is likewise evident, that any kiln might be dried off or "water-smoked" with an up-draft by hot air and gases furnished from the furnaces of an empty kiln, if so desired; which might be in some cases, employed to advantage.

On the other hand, by constructing the central or bottom flues $a'$, in the parts which project beyond the kilns, with removable tops or slab-covers of fire-brick, or otherwise, as shown at $f$, in Fig. 5, fuel may be applied in the central flues for drying off or water-smoking a green-kiln, by the direct application of fire from below in the kiln itself; which construction would be desirable where a single kiln was employed.

The horizontal flues $a'$, under the gratings $a^2$ of the kilns, have been called the "central" flues, in conformity to the brick-maker's use of the term; but it will be more distinctive, for purposes of definition in the claims, to couple therewith the word bottom, so as to make the name read the central or bottom flue.

What I claim, and desire to secure by Letters Patent of the United States, is as follows:

1. The combination with a series of kilns, having all their central or bottom flues connected by one or more transverse flues, and provided with dampers operative to throw any two or more of said kilns in communication with each other, through said transverse flues, of outdraft appliances comprising the main top flue extending over the entire series of kilns, branch flues, for tapping said main top flue and connecting therewith the crown holes of any kiln, and a positive forced draft device applied to said top flue, whereby the burning or hot gases may be drawn from any kiln of the series with a down draft and be forced through and out at the top of any other kiln with an up-draft, substantially as and for the purpose set forth.

2. The combination with a series of kilns having all their central or bottom flues connected by one or more transverse flues, and provided with dampers operative to throw any two or more of said kilns into communication with each other, through said transverse flues, of the out-draft appliances, comprising the main top flue $a^7$, extending over the entire series of kilns, and having elbows $a^9$ closed by removable caps $a^{10}$ the movable branch top flues, $a^{11}$ $a^{12}$, for connecting the crown-holes of any kiln with said main top flue, and a forced draft device, $a^{13}$ in said main top flue, whereby the burning or hot gases may be drawn from any kiln with a down-draft and be drawn through and out of any other kiln with an up-draft, substantially as and for the purposes set forth.

3. In a down-draft kiln, the combination with the kiln grating, of a central or bottom flue and flue-pit, extending thereunder, lengthwise of the single kiln, with said flue having a closed continuous crown and inlets in its sides, and with the side walls of the flue and the flue pit spaced apart to form down passages from said grating to the flue inlets, substantially as described.

4. In a down draft kiln, the combination with a central or bottom flue having separated or discontinuous inlets, of vertical partitions in the flue pit spaced to form a series of separate passages from the kiln grate to said flue inlets, substantially as described.

5. In a down draft kiln, the combination with a central or bottom flue having a series of graduated inlets increasing in size from the point nearest the stack to the point most remote therefrom, of vertical partitions in the flue pit spaced to form separate passages from the kiln grate to said different sizes of flue inlets, substantially as described.

6. In a down draft kiln, the combination with a central or bottom flue closed at its top and having inlets in its sides of vertical partitions in the flue pit spaced to form separate passages from the kiln grate to each pair of opposite flue inlets, substantially as and for the purposes set forth.

7. In a down draft kiln, the combination with a central or bottom flue having an arched and continuous closed crown and a series of graduated inlet openings in its sides increasing from the point nearest, to the point most remote from the stack, and a series of vertical partitions in the flue pit spaced to form separate passages from the kiln grate to each pair of opposite flue inlets, substantially as described.

In testimony whereof I affix my signature in presence of two witnesses.

JOHN K. CALDWELL.

Witnesses:
JAS. F. WILLIAMSON,
EMMA F. ELMORE.